(12) United States Patent
Rogge

(10) Patent No.: US 9,358,922 B2
(45) Date of Patent: Jun. 7, 2016

(54) ILLUMINATION SYSTEM FOR THE INTERIOR OF A MOTOR VEHICLE

(71) Applicant: Daimler AG, Stuttgart (DE)

(72) Inventor: Klaus Rogge, Sindelfingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/427,005

(22) PCT Filed: Sep. 6, 2013

(86) PCT No.: PCT/EP2013/002686
§ 371 (c)(1),
(2) Date: Mar. 10, 2015

(87) PCT Pub. No.: WO2014/040714
PCT Pub. Date: Mar. 20, 2014

(65) Prior Publication Data
US 2015/0239395 A1 Aug. 27, 2015

(30) Foreign Application Priority Data

Sep. 12, 2012 (DE) .......................... 10 2012 017 935

(51) Int. Cl.
*B60Q 3/02* (2006.01)
*H05B 37/02* (2006.01)
(52) U.S. Cl.
CPC .......... *B60Q 3/0293* (2013.01); *H05B 37/0218* (2013.01); *B60Q 2500/00* (2013.01)
(58) Field of Classification Search
None
See application file for complete search history.

(56) References Cited

U.S. PATENT DOCUMENTS

| 5,143,437 A * | 9/1992 | Matsuno | B60Q 3/0293 315/156 |
| 2003/0142504 A1* | 7/2003 | Mueller | B60H 1/00985 362/488 |
| 2005/0219041 A1* | 10/2005 | Dobler | B60Q 9/008 340/425.5 |
| 2010/0265731 A1 | 10/2010 | Van Herpen et al. | |

FOREIGN PATENT DOCUMENTS

| DE | 10 2006 009 636 A1 | 9/2007 |
| DE | 10 2012 002 564 A1 | 9/2012 |
| EP | 2 647 519 A1 | 10/2013 |

OTHER PUBLICATIONS

International Search Report (PCT/ISA/210) dated Feb. 25, 2012 with English-language translation (Four (4) pages).
PCT Written Opinion (PCT/ISA/237) dated Feb. 25, 2012 (Five (5) pages).

* cited by examiner

*Primary Examiner* — Jany Richardson
(74) *Attorney, Agent, or Firm* — Crowell & Moring LLP

(57) ABSTRACT

An illumination system for an interior of a motor vehicle includes a sensor, with which an environmental lighting situation is able to be detected, as well as an illumination device for illuminating the motor vehicle interior. The illumination system has a controller that is subordinate to the sensor and is superordinate the illumination device. The controller adjusts an interior lighting situation depending on the environmental lighting situation that is influenced by actual objects located in the environment of the motor vehicle, by lights of the illumination device.

14 Claims, 1 Drawing Sheet

ILLUMINATION SYSTEM FOR THE INTERIOR OF A MOTOR VEHICLE

BACKGROUND AND SUMMARY OF THE INVENTION

Figure 1:
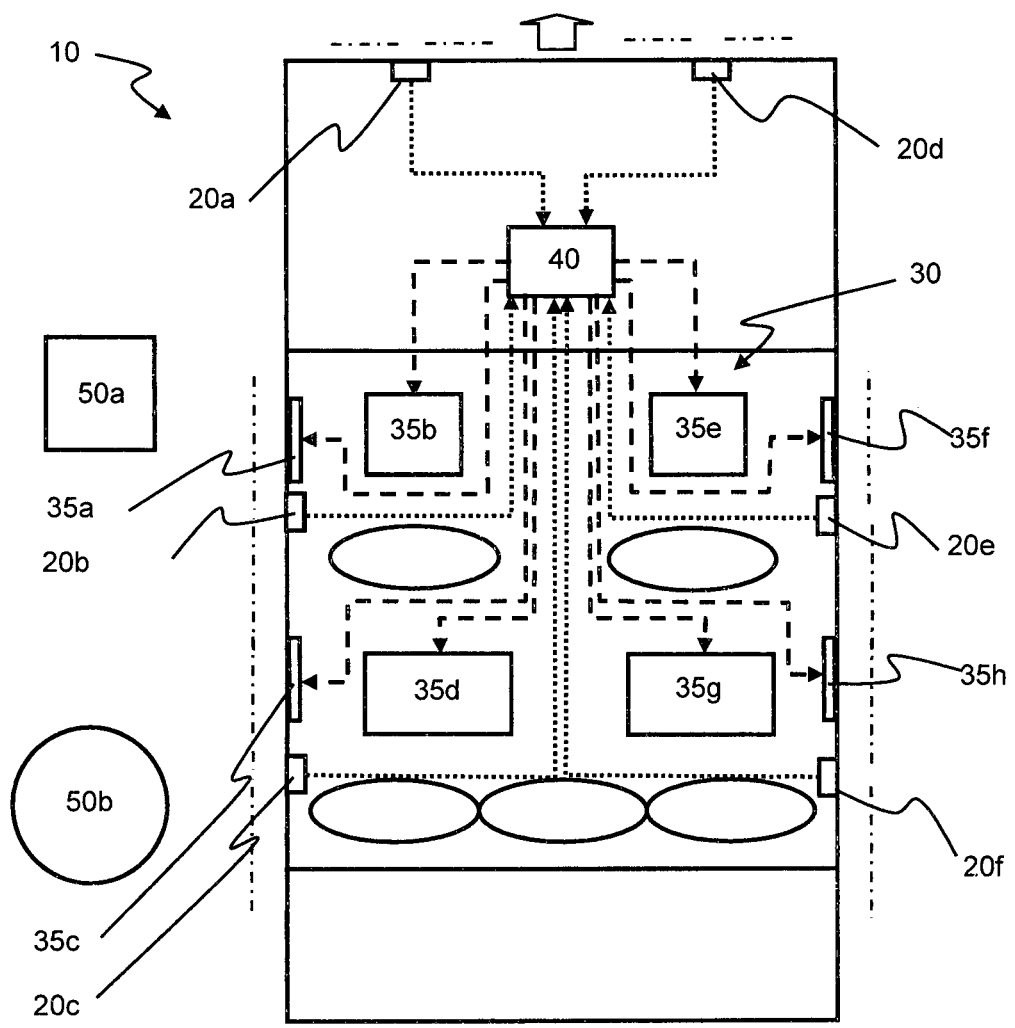

Exemplary embodiments of the invention relate to an illumination system for an interior of a motor vehicle, a method for the generation of an ambient interior lighting situation, as well as a motor vehicle which comprises such an illumination system or in which such a method is carried out.

Motor vehicles typically include interior illumination to produce a brightness level in the vehicle interior, which enables light-intensive tasks such as reading a map. So-called ambient illumination as a rule provides a low brightness level that does not enable light-intensive tasks, yet enables the location of operational elements or adjusts an interior light which is different at least from absolute darkness in an agreeable way.

This type of conventional interior illumination demarcates the passengers from the incidents of the environment outside the motor vehicle.

Exemplary embodiments of the present invention are directed to providing a safe and intuitive operation of a motor vehicle, in particular to provide an environmental lighting situation able to be experienced more intensively by passengers of the motor vehicle.

According to a first aspect of the invention an illumination system for an interior of a motor vehicle, comprises at least one sensor means with which an environmental lighting situation is able to be determined, as well as an illumination device for the illumination of the motor vehicle interior, wherein an ambient interior lighting situation is able to be adjusted depending on the environmental lighting situation using a control means that is subordinate to the sensor means and superordinate to the illumination device. The control means adjusts the interior illumination to the environmental lighting situation in the motor vehicle interior by controlling the illumination device that illuminates the motor vehicle interior.

The environmental lighting situation describes the visually perceptible information that reaches from an environment of a motor vehicle into the interior thereof and could theoretically be perceived by a vehicle passenger in each observed field of vision when looking out of a window of the motor vehicle, provided that the environment is situated at the height of the motor vehicle, so the color and brightness values of a motor vehicle environment, for example of a landscape or street scene, which surrounds a stationary motor vehicle or rolls past a driving motor vehicle. Within the scope of determined embodiments, the environmental lighting situation can also relate to the visually perceivable information for a position which the motor vehicle will only reach in the near future or has passed recently, for example a position up to one hundred meters away.

Any light sensors, brightness sensors, color sensors or cameras are considered as sensor means. Thus, a single sensor means or several sensor means can be present which detect, for example, brightness values or color values of the environmental lighting situation, separated according to functionalities, or which detect the environment in a divided manner according to spatial sections.

The illumination device can be constructed to be varyingly complex and comprises at least one lighting means, which can emit light into the motor vehicle interior, for example a light bulb, halogen bulb, fluorescent tube, light diode or organic light diode. Individual lighting means can also be combined into panels, via which light is able to be emitted on a larger surface. Preferably, several lighting means are present within the illumination device, with which different color effects of the interior lighting situation can be implemented at a point of the motor vehicle interior or light can be emitted at different regions of the motor vehicle interior. The illumination device can comprise further components, such as, for example, beam paths, fiber optics or reflectors, for example to divert light or to distribute light onto larger emission surfaces. Particular examples of illumination devices comprise light panels or light textiles present on one or more surfaces of the motor vehicle interior and which emit light in a flat manner onto the motor vehicle interior and thus contribute to the interior lighting situation.

The control means can be designed to be simple or complex to any extent. In a simple case, for example, the visual information detected by the sensor means is converted into electrical signals that stand for the brightness and/or the color value of the region detected by the respective sensor means, and the light emission is controlled by the illumination system, directly by these electrical signals. In a complex case, the visual information of the environmental lighting situation can be processed by the control means of an image analysis. For example, a spatial resolution of the environment and the adjustment to objects located in the environment can thus be enabled by a targeted control of an illumination device, with which the display of such objects is possible, or in the case of a moving motor vehicle or moving object of the environment, future or past positions of the environment or of the objects can be determined relative to the vehicle which represent the basis for the interior illumination.

The illumination system thus allows an adjustment to the environment lighting situation by the interior lighting situation. The adjustment to the environmental lighting situation by the interior lighting situation does not have to be an exact reproduction. Rather, any interior lighting situation is sufficient that reproduces a dominating brightness or a dominating color or a brightness or color distribution of the environment or a region of the environment which is taken as a respective basis, in the interior or a region of the interior which is taken as a corresponding basis, even with low approximation.

As a rule, the adjustment is actually a simplified display, such that not all visually perceptible information of the environment also influences the interior lighting situation, but rather information averaged over brightness ranges, color ranges and/or spatial ranges. If, for example, a motor vehicle drives down a street at night with office building facades illuminated by illuminated advertising in dominating colors, then the interior lighting situation can adjust to this environmental lighting situation. If the vehicle is located exactly at the height of a façade appearing dominatingly in white light, this is detected via sensor means, whereupon the control means controls the illumination device such that the interior lighting situation is likewise dominated by white light. If the house facade situated next at the height of the motor vehicle is dominated by blue light, then after detection by the sensor means, an interior lighting situation that is likewise dominated by blue colors can be generated via the control means by corresponding control of the illumination device. In the case of sufficient spatial resolution of the sensor means and a correspondingly designed illumination device, a detailed display can occur up to a photo-realistic display. For example, individual light sources in the environment contributing to the environmental lighting situation can be resolved by the sensor means and reproduced by the illumination device as individual objects. If the motor vehicle, for example, drives past a billboard dominated by red color, in front of which a street light having a white light stands, then the illumination device can likewise radiate red colors for the generation of the interior lighting situation, into which a white object is embedded, which is represented to be more or less abstract or detailed.

The illumination system thus removes the isolation between environment and motor vehicle interior in that the environmental lighting situation is adjusted to by the interior lighting situation. Thus, advantageously, the driving experience of the vehicle passenger is increased just as the sense of space and the importance of the interior of the motor vehicle.

The illumination system can comprise one or a few lighting means. For example, light of any color is already able to be generated by a single RGB light diode and the environmental lighting situation is able to be adjusted to as an interior lighting situation by reproduction of the color dominating the environment, for example by the RGB light diode being attached to the vehicle roof in a central position. For a better adjustment to the environmental lighting situation, however, several lighting means are preferably used. According to a particular embodiment, the illumination device enables an emission of light into the motor vehicle interior at least on the vehicle roof or on the side walls of the motor vehicle, for example on certain regions that are limited by the radiation surfaces of lighting means. In particular, in the case of light textiles, the radiation surfaces can be extensive or the entire surface that is visible to a passenger comprising, for example, the interior wall of a vehicle door. Preferably, the emission occurs both on the vehicle roof and on the side walls of the motor vehicle. Alternative embodiments alternatively or additionally provide light emission at further positions of the motor vehicle interior, for example the back sides of the front seat, the arm rests or regions of the dashboard or central console. For the person skilled in the art, it is evident that the more accurate adjustment to the environmental lighting situation can occur, the more points or surfaces the illumination device comprises for emission of light. Advantageously, the environmental lighting situation can be considered for the illumination of the motor vehicle interior, wherein vehicle passengers can advantageously take part in the environmental lighting situation. Advantageously, important stimuli and information can thus be better, in particular more intuitively, perceived. Advantageously, a secure, intuitive driving and/or an intensive experience of the environmental lighting situation are possible.

In one embodiment the interior lighting situation is able to be adjusted in a temporally synchronous manner to the environmental lighting situation. In the case that, for example, an environment which is driven through directly by a motor vehicle is dominated by green light from illuminated advertising and subsequently by yellow light, this momentary environmental lighting situation would also be expressed by a sequence of first dominating green light and subsequently yellow light in the interior lighting situation.

According to an alternative embodiment the interior lighting situation is able to be adjusted to be temporally offset to the environmental lighting situation. The environmental lighting situation can be adjusted to in an anticipatory manner, wherein sensor means already detect the environmental lighting situation of an environment situated in front of the motor vehicle and it is adjusted to in the motor vehicle as an interior lighting situation, before the motor vehicle has reached this environment on its driving route. Alternatively, the environmental lighting situation can be able to be adjusted to with temporal delay, such that the interior lighting situation adjusts, with a delay, to an environmental lighting situation which has already been left behind the vehicle.

The environmental lighting situation can be detected at various degrees of spatial resolution. In a simple case, only one value of the entire environment of the motor vehicle that is averaged over brightness and/or color is determined by the sensor means as an environmental lighting situation and the interior lighting situation is generated by control of the illumination device on the basis of this value. According to further embodiments the environmental lighting situation is detected for spatially resolved regions, for example a region in front of the motor vehicle, a region to the right of the motor vehicle, a region to the left of the motor vehicle and a region behind the motor vehicle, wherein, in developments, smaller and smaller regions can be resolved, for example a region to the front and to the right as well as a region behind and to the right, which can then influence the interior lighting situation in a correspondingly different manner. According to a particular embodiment, the environmental lighting situation is able to be detected by at least one sensor means, by spatial resolution of an actual object on both sides, laterally to the vehicle. Here, an actual object refers to an object that would attract the attention of a passenger of the motor vehicle as an independent object due to its size, for example a street light, an illuminated window or a billboard, and which is able to be reproduced in the interior lighting situation by the illumination device. If, for example, a sensor means determines a yellow street light rolling past the motor vehicle as an actual object of an environmental lighting situation that is dominated by white light, then the interior lighting situation is able to be adjusted by reproduction of this actual object if yellow light temporarily appears in the dominating white light, or, in particular in the case of good spatial resolution of the illumination device, a more or less highly abstract yellow object is able to be represented.

According to specific aspects, a spatial resolution of the environmental lighting situation and a spatial resolution during the adjustment to the environmental lighting situation by the interior lighting situation are provided, which ranges from a strongly pixelated reproduction, so a strong loss of detail, to a photo-realistic reproduction. In an extreme case, the illumination device can, for example, be an LED screen present on an inner side wall of the motor vehicle and which reproduces the scenery rolling by the driving motor vehicle. Preferably, however, the dominating brightness and/or color values of the environmental lighting situation are determined by coarse resolution of actual objects and the reproduction thereof in coarse resolution for the interior illumination situation such that the focus of the interior illumination for classic ambient illumination is more to achieve the lighting atmosphere in the space as a whole than the reproduction of visual information.

According to a second aspect of the invention a method for the generation of an ambient interior lighting atmosphere in an interior of a motor vehicle comprises determining an environmental lighting situation of the motor vehicle, and updating the ambient interior lighting situation depending on the determined environmental lighting situation and thus adjusting to the environmental lighting situation.

The detection can occur using the sensor means referred to within the illumination system according to the invention, with the updating and thus adjustment of the interior lighting situation occurring via a control means which controls a corresponding illumination device.

According to a specific embodiment of the method the interior lighting situation is adjusted synchronously to the environmental lighting situation; an alternative embodiment, on the other hand, provides a temporally offset adjustment, for example an anticipatory or temporally delayed adjustment.

As addressed within the scope of the illumination system according to the invention, the environmental lighting situation can be determined to different degrees of spatial resolution. Correspondingly, also according to a particular embodiment of the method, this is based on a resolution with which actual objects of the environment are reproduced by the interior lighting situation in a manner that is able to be resolved and is more or less abstract or pixelated when adjusting to the environmental lighting situation.

Implicit disclosures, which were made in the scope of the illumination system with regard to the method and reversed, are referred to. The method according to the invention is, in particular, suitable for the operation of an illumination system according to the invention.

A further aspect of the invention relates to a motor vehicle comprising an illumination system according to the invention, or in which a method according to the invention is carried out.

Further advantages, features and details result from the description below, in which—if necessary with reference to the drawing—at least one exemplary embodiment is described in detail. Features depicted in a descriptive and/or pictorial manner can form the subject matter of the invention either alone or in any sensible combination, if necessary also independent of the claims, and can, in particular, additionally also be the subject matter of one or more separate application(s). The same, similar and/or functionally identical parts are provided with the same reference numerals.

BRIEF DESCRIPTION OF THE DRAWING FIGURES

Herein are shown:

FIG. 1 a schematic depiction of an exemplary illumination system, and

Figure 2:
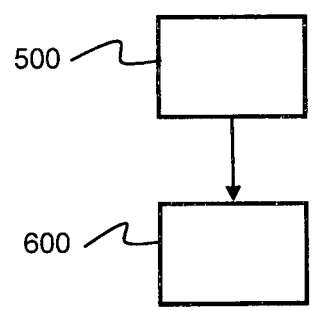

FIG. 2 a schematic flow diagram of a method according to the invention.

DETAILED DESCRIPTION

FIG. 1 is a schematic depiction of an exemplary illumination system. Two front seats and three rear seats are shown in a motor vehicle 10 from the inside of a vehicle interior. The illumination system has several sensors 20a, 20b, 20c, 20d, 20e and 20f that determine the environmental lighting situation in the vehicle environment to the left and right in front of the vehicle 10 (sensors 20a and 20d), to the left of the motor vehicle 10 in a front and a rear region (sensors 20b and 20c), as well as to the right of the motor vehicle 10 in a front and a rear region (sensors 20e and 20f). Exemplary detection regions of the sensor means 20 are specified by dashed lines. The data detected by the sensor means 20 is transferred to a control means 40 via data connections which are symbolized in FIG. 1 by dotted lines. The control means 40 transmits control commands to an illumination device 30 which comprises several lighting means 35a-h via further data connections which are symbolized by dashed lines in FIG. 1. The lighting means 35a present on the inner side of the left front door and the lighting means 35b present on the vehicle roof over the left front seat mainly adjust the interior lighting situation in the region of the front left vehicle interior region, and the lighting means 35e and 35f which are correspondingly present on the right sides adjust that of the front right vehicle interior region. The lighting means 35c present on the left side wall of the back region and the lighting means 35d present on the vehicle roof over the left back seat region are responsible for the interior lighting situation in the left rear region, and the lighting means 35g and 35h for the right rear region.

An actual object 50a is located to the left of the motor vehicle 10 at the height of the left front seat. The visual information emitted from the actual object 50a and which contributes to the environmental lighting situation in this region is detected by the sensor means 20b and corresponding data is transmitted to the control means 40. This transmits control commands to the lighting means 35a and 35b, which emit light in order to adjust to the environmental lighting situation in the motor vehicle interior as an interior lighting situation of this region on the basis of the visual information, in which the environmental lighting situation determined by the sensor means 20a also enters to the right and to the front of the motor vehicle 10. The environmental lighting situation in the region of the left rear space is determined, on the other hand, substantially by the actual object 50b detected in this region mainly by sensor means 20c and partially even by sensor means 20b. The corresponding data is transmitted to the control means 40, which sends control data in order to adjust to the environmental lighting situation of the detected region as an interior lighting situation in the region of the left rear space, substantially by the lighting means 35c and 35d. No actual objects 50 are specified in the environment on the right side of the motor vehicle 10. The environmental lighting situation in this region is determined substantially, for example, by the sky and the ground surface or the covering thereof, determined by the sensor means 20e and 20f and reproduced via the lighting means 35e to 35h as an interior lighting situation. Overall, an environmental lighting situation and an interior lighting situation are composed from these environmental lighting situations and interior lighting situations which now describe partial regions.

As the motor vehicle 10 advances in a forward direction, which is symbolized by an open arrow, the actual object 50a migrates in an enhanced manner into the detection region of the sensor means 20c and correspondingly has an enhanced influence on the interior lighting situation in the region of the left rear region. This is based on a synchronized adjustment of the interior lighting situation, depending on the environmental lighting situation. In the case of a temporally offset and widely anticipatory adjustment, the environmental lighting situation to the right in front of the motor vehicle 10 determined by the sensor means 20a would, for example, form the basis for the control of the lighting means 35a to 35d. In the case of a less widely anticipatory adjustment, the environmental lighting situation detected by the sensor means 20b would, for example, form the basis for the control of the lighting means 35c and 35d, so would, for example, consider the contribution of the actual object 50a to the environmental lighting situation for the interior situation of the left rear space, while the actual object 50a itself is still located at the height of the left front seat. In the case of a delayed or retrospective adjustment, the region of the environmental lighting situation detected by the sensor means 20c which is influenced substantially by the actual object 50b, would, for example, substantially form the basis for the interior situation in the region of the left front seat which is adjusted by means of the lighting means 35a and 35b.

For the person skilled in the art it is evident that FIG. 1 only reproduces, by way of example, a possible number and arrangement of sensor means 20 and lighting means 35 of an illumination device 30 as well as data connections to the control means 40. The person skilled in the art can thus, of course, make adjustments in order to adapt the shown illumination system for motor vehicles having a different interior distribution and/or for illumination systems having a deviating number, arrangement and/or functionality (for example white light lighting means in comparison to colored light lighting means).

FIG. 2 shows a schematic flow diagram of a method according to the invention. In a first method step 500, an environmental lighting situation of the motor vehicle 10 is determined by using sensor means 20, for example. In a second method step 600, an adjustment of the interior lighting situation takes place depending on the determined environmental lighting situation. The adjustment takes place, for example, by a control means 40 transmitting control commands to lighting means 35 of an illumination device 30 depending on data which represents the environmental lighting situation. The lighting means 35 generate an interior lighting situation which adjusts to the environmental lighting situation on the basis of the control commands which control, for example the brightness, the color and/or the lighting duration of the light emitted by them.

Although the invention has been illustrated and explained in detail by preferred exemplary embodiments, the invention is not restricted by the disclosed examples and other variations can be derived from this by the person skilled in the art without leaving the scope of protection of the invention. It is therefore clear that a plurality of possibilities for variation exist. It is likewise clear that embodiments that are referred to by way of example truly only represent examples which cannot be understood in any way as a restriction of the scope of protection, the application possibilities or the configuration of the invention. Rather, the description and description of the figures above put the person skilled in the art in the position to practically implement the exemplary embodiments, wherein the person skilled in the art can implement a plurality of changes, for example with regard to the function or the arrangement of individual elements referred to in an exemplary embodiment, in the knowledge of the disclosed inventive concept without leaving the scope of protection which is defined by the claims and the legal equivalents thereof, such as, for example further explanation in the description.

The invention claimed is:

1. An illumination system for an interior of a motor vehicle, comprising:
    a sensor configured to detect an environmental lighting situation, wherein the environmental lighting situation is based on visually perceptible information associated with an environment exterior to the motor vehicle;
    an illumination device configured to illuminate the motor vehicle interior;
    a controller, which is subordinate to the sensor and the illumination device, and which is configured to adjust an ambient interior lighting situation depending on the detected environmental lighting situation, and
    wherein the controller is configured to adjust the interior lighting situation temporally offset to the detected environmental lighting situation.

2. The illumination system of claim 1, wherein the illumination device is configured to emit light into the motor vehicle interior at least on a roof or side walls of the vehicle.

3. The illumination system of claim 1, wherein the controller is configured to adjust the interior lighting situation in a temporally synchronous manner to the detected environmental lighting situation.

4. The illumination system of claim 1, wherein the sensor is configured to detect the environmental lighting situation by spatial resolution of actual objects on both sides, laterally to the motor vehicle and the controller is configured to adjust the interior lighting situation by relaying the actual objects using the illumination device.

5. The illumination system of claim 1, wherein the controller is configured to adjust the interior lighting situation to correspond with the detected environmental lighting situation before the motor vehicle reaches the environment.

6. The illumination system of claim 1, wherein the controller is configured to adjust the interior lighting situation to correspond with the detected environmental lighting situation and for a temporal delay after the motor vehicle has passed the environment.

7. A method for generating an ambient interior lighting situation in a motor vehicle interior, the method comprising:
    determining, using a sensor, an environmental lighting situation of the motor vehicle, wherein the environmental lighting situation is based on visually perceptible information associated with an environment exterior to the motor vehicle;
    updating, by a controller coupled to the sensor, the ambient interior lighting situation depending on the determined environmental lighting situation and thereby adjusting the interior lighting situation to the environmental lighting situation,
    wherein the interior lighting situation is adjusted to be temporally offset to the environmental lighting situation.

8. The method of claim 7, wherein the interior lighting situation is adjusted synchronously to the environmental lighting situation.

9. The method of claim 7, further comprising:
    relaying an actual object of the environmental lighting situation when adjusting the interior lighting situation.

10. The method of claim 7, wherein the interior lighting situation is adjusted to correspond with the detected environmental lighting situation before the motor vehicle reaches the environment.

11. The method of claim 7, wherein the interior lighting situation is adjusted to correspond with the detected environmental lighting situation and for a temporal delay after the motor vehicle has passed the environment.

12. A motor vehicle, comprising:
    an interior; and
    an illumination system for the interior of a motor vehicle, the illumination system comprising
        a sensor configured to detect an environmental lighting situation, wherein the environmental lighting situation is based on visually perceptible information associated with an environment exterior to the motor vehicle;
        an illumination device configured to illuminate the motor vehicle interior;
        a controller, which is subordinate to the sensor and the illumination device, and which is configured to adjust an ambient interior lighting situation depending on the detected environmental lighting situation,
        wherein the controller is configured to adjust the interior lighting situation temporally offset to the detected environmental lighting situation.

13. The motor vehicle of claim 12, wherein the controller is configured to adjust the interior lighting situation to correspond with the detected environmental lighting situation before the motor vehicle reaches the environment.

14. The motor vehicle of claim 12, wherein the controller is configured to adjust the interior lighting situation to correspond with the detected environmental lighting situation and for a temporal delay after the motor vehicle has passed the environment.

* * * * *